(12) United States Patent
Palanisamy et al.

(10) Patent No.: US 12,346,195 B2
(45) Date of Patent: Jul. 1, 2025

(54) CALLHOME CLASSIFIER WITH INSTANTANEOUS LOG COLLECTION AND CONTEXTUAL LOG ANALYSIS

(71) Applicant: Dell Products L.P., Round Rock, TX (US)

(72) Inventors: Kumaravel Palanisamy, Bangalore (IN); Rashmi Shashidhar, Bangalore (IN); Kiran Kumar Grandhi, Bangalore (IN); Vijay Srinivasan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 81 days.

(21) Appl. No.: 18/467,872

(22) Filed: Sep. 15, 2023

(65) Prior Publication Data
US 2025/0094265 A1  Mar. 20, 2025

(51) Int. Cl.
*G06F 11/00* (2006.01)
*G06F 11/07* (2006.01)

(52) U.S. Cl.
CPC ...... *G06F 11/0784* (2013.01); *G06F 11/0709* (2013.01)

(58) Field of Classification Search
CPC ............ G06F 11/0709; G06F 11/0784; G06F 11/0769; G06F 11/0778
See application file for complete search history.

(56) References Cited

U.S. PATENT DOCUMENTS

| | | | |
|---|---|---|---|
| 2014/0059394 A1* | 2/2014 | Mahindru | G06F 11/07 714/48 |
| 2020/0174878 A1* | 6/2020 | Schmitt | G06F 11/0781 |
| 2020/0379871 A1* | 12/2020 | Prakash | G06F 40/205 |
| 2020/0379873 A1* | 12/2020 | DeMeuse | G06F 11/3476 |
| 2021/0271540 A1* | 9/2021 | Sinnan Muthusamy | G06F 11/079 |
| 2022/0350692 A1* | 11/2022 | Chilamakuri | G06F 11/0709 |
| 2024/0036964 A1* | 2/2024 | Wang | G06F 11/0781 |

\* cited by examiner

*Primary Examiner* — Marc Duncan
(74) *Attorney, Agent, or Firm* — Daly, Crowley, Mofford & Durkee, LLP

(57) ABSTRACT

A method comprising: detecting an event that is indicative of an error that has occurred in a first computing system; identifying a subsystem and an object that are associated with the event; identifying one or more log files that are associated with the subsystem and object; generating a first event report that is associated with the event, the first event report including the one or more log files, the first event report identifying the subsystem and the object that are associated with the event; identifying a support team that is associated with the event based on the object and subsystem; and routing the first event report to the support team.

17 Claims, 9 Drawing Sheets

CALLHOME CLASSIFIER WITH INSTANTANEOUS LOG COLLECTION AND CONTEXTUAL LOG ANALYSIS

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided, comprising: detecting an event that is indicative of an error that has occurred in a first computing system; identifying a subsystem and an object that are associated with the event; identifying one or more log files that are associated with the subsystem and object; generating a first event report that is associated with the event, the first event report including the one or more log files, the first event report identifying the subsystem and the object that are associated with the event; identifying a support team that is associated with the event based on the object and subsystem; and routing the first event report to the support team.

According to aspects of the disclosure, a system is provided, comprising: a memory; and one or more processors that are coupled to the memory, the one or more processors being configured to perform the operations of: detecting an event that is indicative of an error that has occurred in a first computing system; identifying a subsystem and an object that are associated with the event; identifying one or more log files that are associated with the subsystem and object; generating a first event report that is associated with the event, the first event report including the one or more log files, the first event report identifying the subsystem and the object that are associated with the event; identifying a support team that is associated with the event based on the object and subsystem; and routing the first event report to the support team.

According to aspects of the disclosure, a non-transitory computer-readable medium is provided that stores storing one or more processor-executable instructions, which, when executed by at least one processor, cause the at least one processor to perform the operations of: detecting an event that is indicative of an error that has occurred in a first computing system; identifying a subsystem and an object that are associated with the event; identifying one or more log files that are associated with the subsystem and object; generating a first event report that is associated with the event, the first event report including the one or more log files, the first event report identifying the subsystem and the object that are associated with the event; identifying a support team that is associated with the event based on the object and subsystem; and routing the first event report to the support team.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

A conventional software system may route events, errors, and alerts to support personnel for further processing. In conventional software systems, the response to such events, errors, and alerts may be reactive and manual. In case of critical issues, it may take multiple iterations to identify the right engineering team to look at the issue and suggest the next steps for resolving the issue. Since this support system is manual and human-dependent, it may result in an extended delay before an issue is resolved, which could hurt business continuity and overall customer experience.

According to the present disclosure, an improved engine for handling events, errors, and alerts is provided. The engine may be configured to identify logs and other information that is relevant to a particular event, error, or alert, and it may generate a report for the event, error, or alert. The engine may package the logs and other information together with the report, and identify a customer support team that is best suited for resolving the event, error, or alert, after which the engine may route the report and other information to the identified customer support team. The improved engine is advantageous because it may reduce the time it takes to find a customer support team that is suitable for handling the error, event, or alert. Moreover, because the engine generates a report that could be helpful in resolving the event, error, or alert, using the engine could increase the speed at which support personnel is able to resolve the event, error, or alert.

Figure 1:
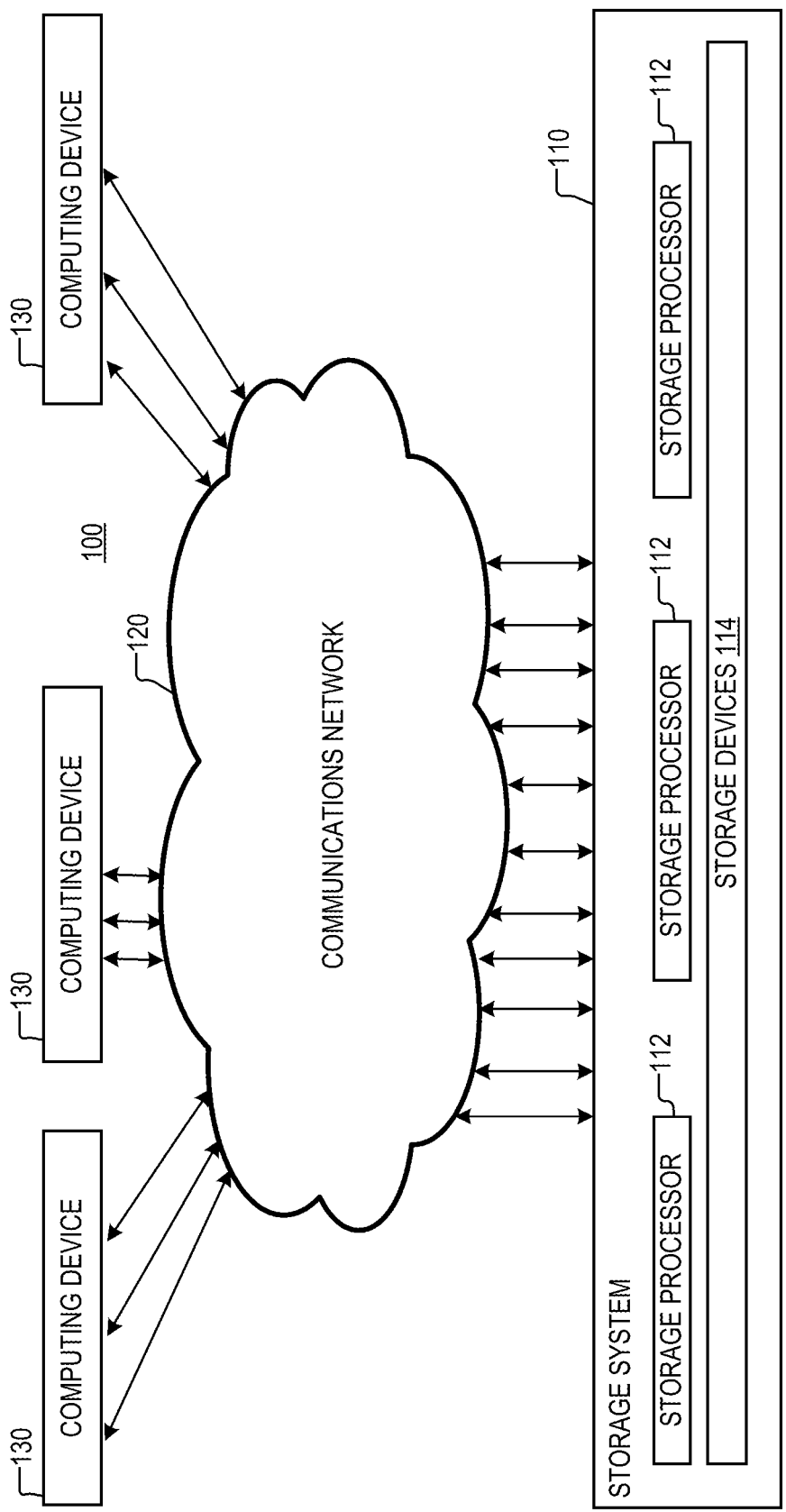
FIG. 1 is a diagram of an example of a system, according to aspects of the disclosure.

FIG. 1 is a diagram of an example of a system 100, according to aspects of the disclosure. As illustrated, system 100 may include a storage system 110, a communications network 120, and a plurality of computing devices 130. The communications network 120 may include one or more of a fibre channel (FC) network, the Internet, a local area network (LAN), a wide area network (WAN), and/or any other suitable type of network. The storage system 110 may include a storage system, such as DELL/EMC Powermax™, DELL PowerStore™, and/or any other suitable type of storage system. The storage system 110 may include a plurality of storage processors 112 and a plurality of storage devices 114. Each of the storage processors 112 may include a computing device, such as the computing device 600, which is discussed further below with respect to FIG. 6. Each of the storage processors 112 may be configured to receive I/O requests from computing devices 130 and execute the received I/O requests by reading and/or writing data to storage devices 114. Each of the storage devices 114 may include one or more of a solid-state drive (SSD), a hard disk (HD), a non-volatile random-access memory (NVRAM) device, a non-volatile memory express (NVMe) device, and/or any other suitable type of storage device.

Figure 2:
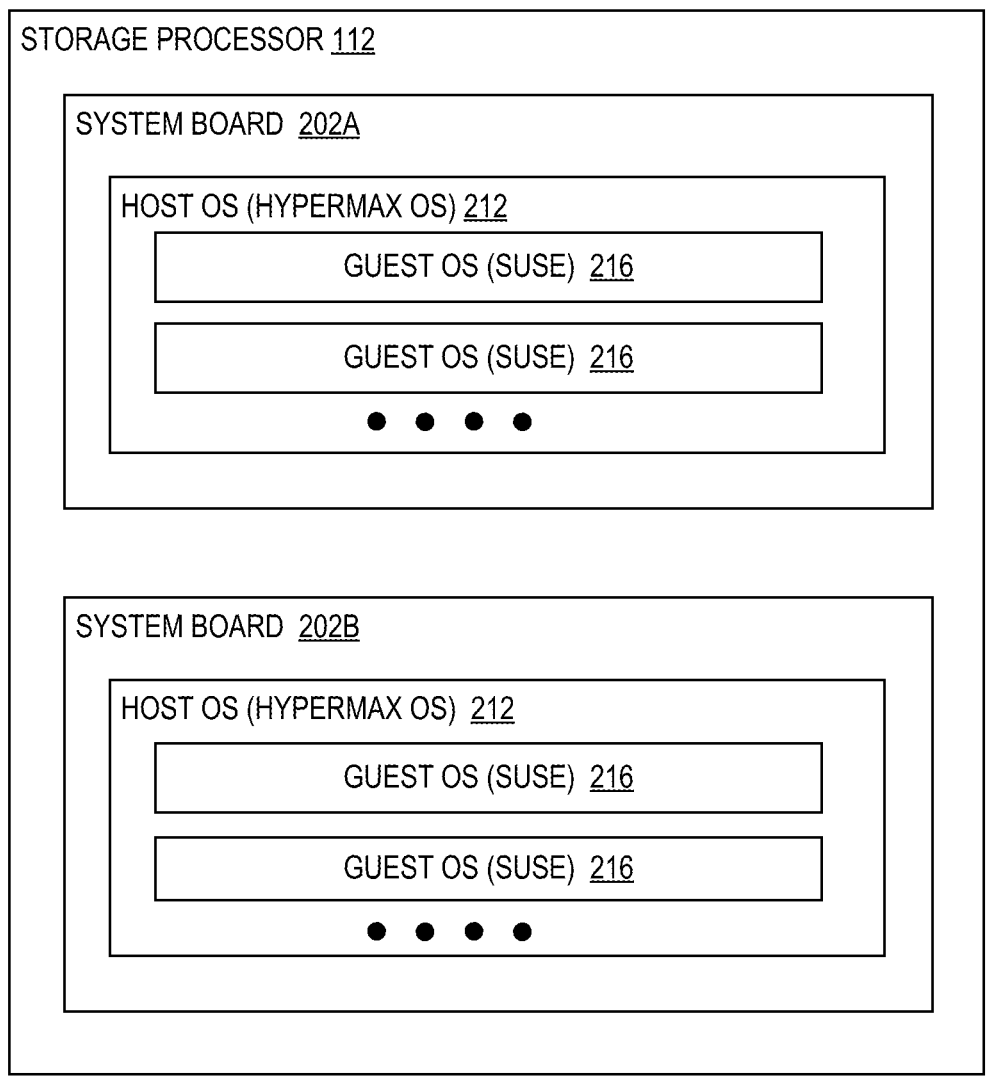
FIG. 2 is a diagram of an example of a storage processor, according to aspects of the disclosure.

FIG. 2 is a diagram of a storage processor 112, according to one possible implementation. In some implementations, each of the storage processors 112 in the storage system 110 may have the configuration that is shown in FIG. 2. As illustrated, the configuration of a storage processor 112, which is shown in FIG. 2 may include system boards 202A and 202B. Each of system boards 202A and 202B may include a motherboard, a processor (e.g., an x86 processor or a MIPS processor, etc.), a memory (e.g., Double Data Random Access Memory (DDRAM), etc.), and/or any other suitable type of component. Each of the system boards 202A and 202B may be configured to execute a respective host operating system (OS). Inside each respective host operating system 212, one or more container threads (not shown) may be executed. Each container thread may spawn a different respective guest operating system instance (i.e., one of the guest operating systems 216) and be responsible for providing virtualized resources to the guest operating system. Each of the container threads may provide various system libraries, binaries, and configuration files that are necessary for the execution of the container thread's respective guest operating system instance. In the present example, each of the guest operating systems 216 is a SUSE Linux™ operating system, however, the present disclosure is not limited to using any specific type of operating system being used.

Figure 3:
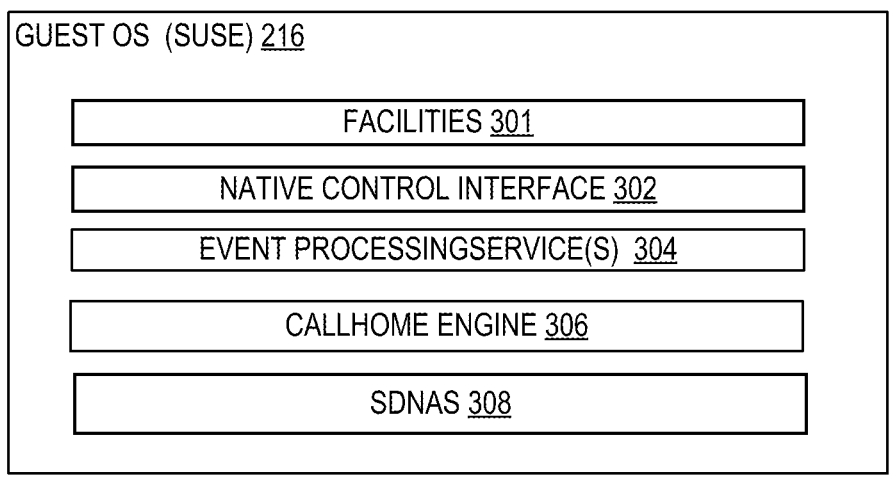
FIG. 3 is a diagram of an example of guest operating system instance, according to aspects of the disclosure.

FIG. 3 is a diagram of an example of a guest operating system (OS) 216, according to aspects of the disclosure. In the example of FIG. 3, guest OS 216 may be configured to execute one or more facilities 301, a respective native control interface layer 302, one or more event processing services 304, a call-home engine 306, and a respective SDNAS layer 308.

Facilities 301 may include one or more Network Attached Storage (NAS) facilities. Each of the facilities 301 may be a virtual container that hosts one or more file system objects (or file systems). Each of the facilities 301 may be configured to receive filesystem read or write requests (as well as other filesystem requests), and execute the received requests by reading, writing, deleting, or otherwise moving data on the storage devices 114. Any of the received requests may be executed by invoking respective Application Programming Interface (API) methods that are provided by the file system/other file object that is associated with the request. Although, in the present example, facilities 301 are NAS facilities, the present disclosure is not limited to any specific type of containerized application or service being used in place of a NAS facility.

The SDNAS layer 308 may be configured to provide file systems, snapshot generation services, and naming services, such as Domain Name Service (DNS), Lightweight Directory Access Protocol (LDAP), Network Information Service (NIS), etc. Furthermore, the SDNAS layer 308 may provide a communication protocol stack and/or one or more network protocols, such as Samba (SMB), File Transfer Protocol (FTP), Network File System (NFS), or Secure FTP (SFTP). In some implementations, the SDNAS layer may include an embedded software-defined network-accessible storage (NAS) solution offering reliable, highly available, scale-out, high-performance, 64-bit file system facility.

Event processing services 304 may include one or more Corosync and/or any other suitable type of messaging service. The native control interface 302 may be configured to direct critical events, errors, or alerts that are raised in any of the master containers to engine 306 (hereinafter "engine 306). Engine 306 may include software and/or hardware for processing events that are generated in response to an error or alert in guest OS 216. The operation of engine 306 is discussed further below with respect to FIGS. 4-5D.

Callhome engine 306 (hereinafter "engine 306") may be arranged to collect and/or generate various support materials for a callhome. Engine 306 may be implemented as a service that is running as part of the file cluster stack of storage system 110 (e.g., Powermax File Cluster Stack). Engine 306 may monitor and process callhome events that are generated in the guest OS (or storage processor) where engine 306 is executed.

Under the nomenclature of the present disclosure, a high-priority event is also referred to as a "callhome event" or just a "callhome". Etymologically, the term "callhome" is derived from the event triggering a call (or transmission) to the home base (or another facility) of the manufacturer of a storage system, where the event is to be examined further by support personnel. In general, a callhome may be generated in response to the detection of an error or alert. A callhome may be an object (or just a string) that contains one or more of a description of the error, a type of the error, an error code associated with the error, and/or any other suitable information.

In one implementation, engine 306 may take advantage of existing services and/or middleware to intercept events (e.g., error events) that are generated in the guest OS where engine 306 is executed. In one example, when an event is generated, it may be classified as a high-priority event (which is also referred to as "callhome event") or a low-priority event by existing middleware in the guest OS. The classification may be performed by middleware that is executing the guest OS. Engine 306 may intercept, or otherwise obtain, events that are classified as high-priority (or call-home) events.

Figure 4:
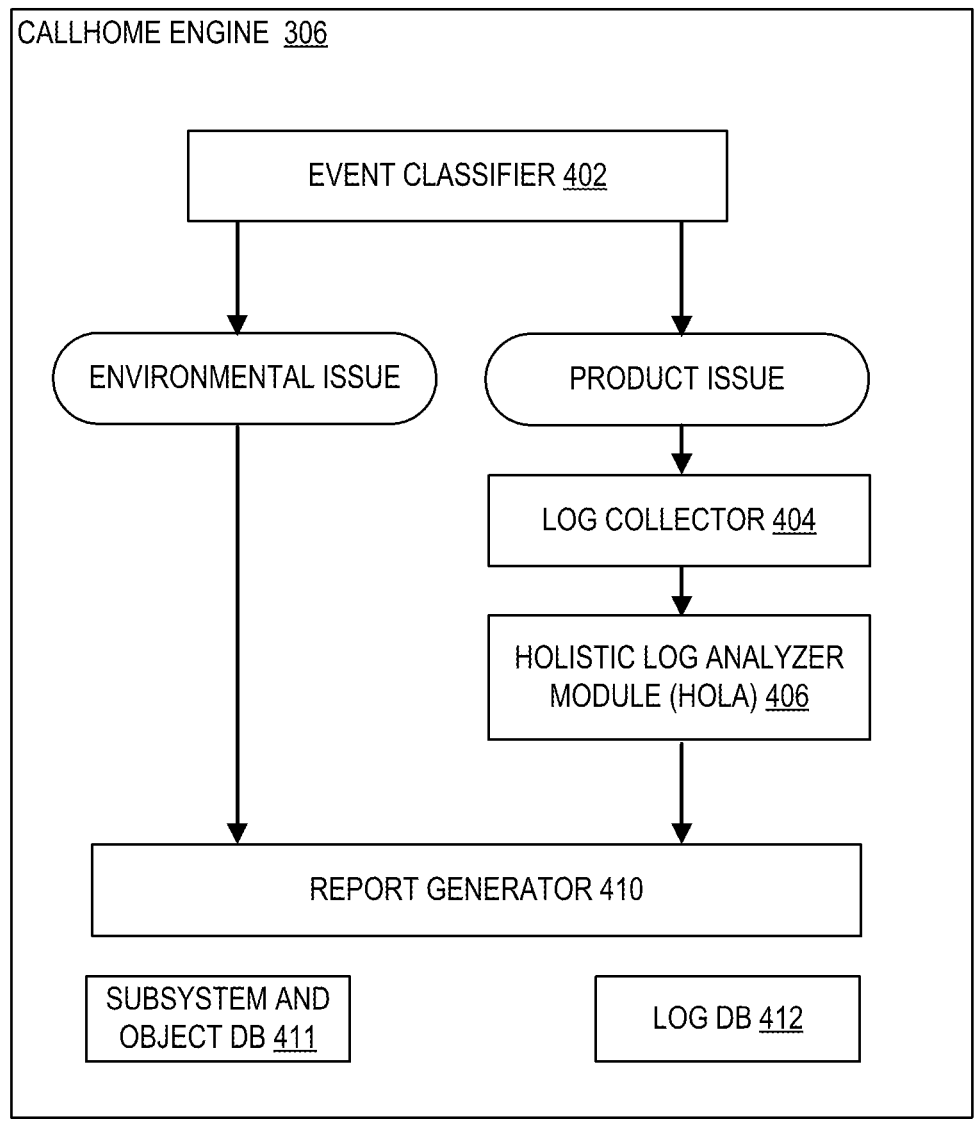
FIG. 4 is a diagram of an example of a callhome engine, according to aspects of the disclosure.

FIG. 4 shows an example of the engine 306, according to aspects of the disclosure. As illustrated, engine 306 may include an event classifier, a log collector 404, a holistic log analyzer module (HOLA) 406, a report generator 410, a database 411, and a database 412.

Classifier 402 may classify a callhome event as being directed to either an environmental issue or a product issue. Classifier 402 may look for events such as link status down, Interface IP not reachable, fabric not detected, battery out of compliance, high disk usage etc. which are designated as environmental issues. Upon receiving a callhome event, classifier 402 may compare the description of the event (e.g., the contents of the event) with an inbuild list of issues that are regarded as environmental, and classify the event as directed to an environmental issue if the description (or contents) of the event matches any of the issues in the list. In other words, the contents of a callhome may include a description of the issue that caused the callhome to be generated, and if the same or similar description is found in the list, the event may be regarded as being associated with an environmental issue.

Additionally or alternatively, in one example, to determine the classification of a given callhome, classifier 402 may use a list that identifies (explicitly or implicitly) each of a plurality of event descriptions as either being related to a product issue or an environmental issue. The data structure may be stored in the memory of the storage processor executing the engine 306 or elsewhere. When a callhome is received by classifier 402, classifier 402 may extract the description of the callhome (from the object that constitutes the callhome) and subsequently perform a search of the list to determine if the extracted description is identified (in the list) as corresponding to a product issue or an environmental issue. If the extracted description matches a description in the list that is identified as corresponding to a product issue, the callhome may be considered related to a product issue. Otherwise, if the extracted description matches a description in the list that is identified as corresponding to an environmental issue, the callhome may be considered related to an environmental issue.

A callhome may be directed to an environmental issue, when the callhome is generated in response to an error caused by a loose cable, hardware gone bad, or another failure of a physical system component. On the other hand, a callhome may be directed to a product issue when the callhome is generated by a software bug or another problem with the software. A callhome associated with an environmental issue may be handled by sending an on-site technician to fix the error. On the other hand, a callhome associated with a product issue may be handled by sending the callhome to a support team that would examine the error, and possibly fix the error by changing (e.g., modifying or extending, etc.) source code that caused the callhome to be generated.

When a callhome is classified as being directed to an environmental issue, engine 306 may generate a summary report associated with the callhome and route the callhome to a support team that specializes in handling environmental issues (e.g., a team of field technicians). The summary report may include at least a portion of the callhome's contents. On the other hand, when a callhome is associated with a product issue, engine 306 may use the log collector 404 and HOLA 406 to generate a HOLA report, which is subsequently routed to a support team that specializes in handling product issues (e.g., a software development team). More particularly, when a callhome is classified as directed to a product issue, engine 306 may perform log collection and analysis to establish the sequence of operations, performed just before the callhome (e.g., sequence of operations 1 hour before the callhome or another predetermined period before the callhome), which would help find the root cause of the issue, and include the collected logs and the identified sequence of operation in the HOLA report.

Specifically, once the classifier 402 classifies a callhome as being directed to a product issue, the callhome may be passed for further processing to log collector 404, which would capture all logs that are associated with the callhome. To identify which logs are associated with the callhome, log collector 404 may use databases 411 and 412, the contents of which are discussed further below with respect to Tables 1 and 2. Moreover, in addition to logs, log collector 404 may collect core dumps (hereinafter "cores") that are generated by the guest OS (and/or storage processor) where engine 306 is executed. In some implementations, log collector 404 may also generate a system-level report that identifies one or more internal system OS (uCode) errors and the error stack for each error. In some implementations, the report may include errors that occurred at the time the callhome was generated or within a predetermined period before or after the callhome, but not errors generated outside of this period.

A callhome may be associated with a subsystem and an object. The subsystem and object associated with the callhome may be identified by using a database 411. Table 1 below shows an example of the contents of database 411. As illustrated, database 411 may be include a plurality of entries, wherein each entry corresponds to a different row in Table 1. Each entry may include a signature of a callhome, an identifier of an object that is associated with the callhome, and an identifier of the subsystem that is associated with the callhome. To determine the object and subsystem of an incoming callhome, HOLA analyzer 406 (and/or log collector 404) may identify an entry in database 411 whose signature matches the contents of the callhome. Afterwards, HOLA analyzer 406 (and/or log collector 404) may retrieve the respective object identifier and subsystem identifier that are contained in the entry. The retrieved object and subsystem identifier may then be designated (or regarded) as being associated with the entry. Additionally or alternatively, HOLA analyzer 406 and/or log collector 404 may identify the object associated with the incoming callhome by retrieving an identifier of the object from the callhome's contents. As used herein, the term "subsystem" refers to a portion of a software system. For example, a subsystem may include a particular API, a particular software layer, or a portion of a particular API or software layer.

By way of example, a callhome may be associated with one of the following two subsystems "SDNAS" and "Platform Integration". Each subsystem may have a different support team. Thus, identifying the subsystem associated with a callhome may help determine the support team to which the callhome needs to be routed. Moreover, the subsystem identifier for a particular callhome may be cross-referenced in database 412 to determine which logs (and/or other information items) need to be retrieved in response to the callhome.

TABLE 1

Example of Possible Contents of Database 411

| Callhome Signature | Object Identifier | Subsystem Identifier |
|---|---|---|
| The %(fsname) file system in NAS server %(vdmname) (fsid %(fsid)) is offline due to receiving an I/O error. | Filesystem offline | SDNAS |
| The %(fsname) file system in NAS server %(vdmname) (fsid %(fsid)) is offline after discovering corruption. | Filesystem corruption | SDNAS |
| NAS node %(node) is down and its automatic recovery has failed. | Automatic recovery has failed | SDNAS |
| NAS Node %(node) is down and automatic node recovery is disabled. | Automatic recovery is disabled | SDNAS |
| NAS server %(vdmname) fault tolerance is degraded. | Fault tolerance is degraded | SDNAS |
| The NAS server %(vdmname) is in an unrecoverable state after its deletion that have failed. | Unrecoverable state | SDNAS |
| The HA resource %(ha_resource) stopped on File %(nodeid). | HA resource stopped | Platform integration |
| The %(ha_resource) is Fenced for File %(nodeid). | HA resource fenced | Platform integration |

TABLE 1-continued

Example of Possible Contents of Database 411

| Callhome Signature | Object Identifier | Subsystem Identifier |
|---|---|---|
| Update cluster MTU operation and roll back of the same have failed. | Update cluster MTU | Platform integration |

Table 2 below shows an example of the contents of database 412, according to aspects of the disclosure. Each row in Table 2 corresponds to a different one of a plurality of entries in database 412. Each of the plurality of entries may include a respective object identifier, a respective subsystem identifier, and a list of one or more logs (e.g., log files, etc.) that need to be retrieved for a particular callhome when the callhome is associated with the respective subsystem identifier and the respective object identifier.

TABLE 2

Example of Possible Contents of Database 412

| Object Identifier | Subsystem Identifier | Log files to be scanned |
|---|---|---|
| Filesystem offline | SDNAS | uCode SDNAS logs |
| Filesystem corruption | SDNAS | uCode SDNAS logs |
| Automatic recovery has failed | SDNAS | SDNAS logs Pfile logs |
| Automatic recovery is disabled | SDNAS | SDNAS logs |
| Fault tolerance is degraded | SDNAS | SDNAS logs |
| Automatic node recovery disabled | SDNAS | SDNAS logs |
| Unrecoverable state | SDNAS | SDNAS logs |
| HA resource stopped | Platform integration | /var/log/messages Pacemaker logs |
| HA resource fenced | Platform integration | /var/log/messages Pacemaker logs |
| Update cluster MTU | Platform integration | Sysmgmt.log |

For any given callhome, HOLA 406 may generate a report (hereinafter "HOLA report") that includes an identification of the issue associated with the callhome along with relevant logs that are collected by log collector 404 for the callhome. In addition, HOLA 406 may identify a support team that is best suited for handling the callhome and route the HOLA report to the support team. Routing a HOLA report to a particular support team may include one or more of: (i) storing the HOLA report in a database along with an indication that the HOLA report should be handled by the particular support team, (ii) storing the HOLA report in a database or database portion that is associated with the particular support team, (iii) transmitting the HOLA report over a communications network to a computing device/system that is associated with the particular support team. In addition, HOLA 406 may also capture the system configuration of the guest OS or storage processor executing the engine 306, and store the system configuration in the HOLA report. Examples of different types of information that can be included in the HOLA report are provided further below.

One possible example of a HOLA report that can be generated by HOLA 406 is shown in Table 3 below. As illustrated, the HOLA report may include an "Initial Triage" section, a "System Configuration" section, and a "Logs Collected" section. The Logs Collected section may include (e.g., as attachments) all logs and/or other information that is collected for the callhome by log collector 404. The System Configuration may identify the system configuration of the guest OS, network accessible storage (NAS) objects and/or storage processor on which the engine 306 is executed. The Initial Triage section may include one or more of the contents of the callhome, an identifier of an object that is associated with the callhome, and an identifier of a subsystem that is associated with the callhome. Furthermore, although not shown in Table 3, the Initial Triage section may include an indication of one or more operations that were performed in a period preceding the callhome. The one or more operations may be determined by HOLA 406 based on the logs collected by log collector 404. Furthermore, the Initial Triage section may include identifying one or more error codes that were generated by any inline utilities that are executed for the callhome (e.g., based on logs associated with the callhome that are retrieved by log collector 404). Furthermore, the initial triage section may include the codes of errors that are generated in the guest OS (and or storage processor) where engine 306 is executed in a period preceding the callhome. Furthermore, although not shown in Table 3, the initial triage section may identify operations that are performed in the guest OS (and or storage processor) where engine 306 is executed in a period preceding the callhome. The one or more operations may be retrieved by HOLA 406 from the logs collected by log collector 404. Furthermore, the Initial Triage section may include an identifier of the support team that is selected to receive the callhome.

In some implementations, HOLA 406 may perform a search of a knowledge database to identify a possible cause for the callhome (or the error that gave rise to the callhome), after which an indication of the possible cause may be inserted into the HOLA report. In some implementations, any suitable type of knowledge database that is known in the art can be used. In some implementations, the search of the knowledge database may be performed based on information that is present in the collected logs, the contents of the callhome, and/or based on operations that are executed prior to callhome being generated. It will be understood that the present disclosure is not limited to using any specific type of information to search the knowledge database. The knowledge database may include any conventional knowledge database that is customarily used by software developers and software support specialists.

TABLE 3

Example of a HOLA report

{
  "initialTriage":
  {
    "callHomeEvent": "File system Auto1_KFS1_Auto1_KNAS11_41 in NAS server Auto1_KNAS11 (fsid 145) is offline due to receiving an I/O error." // this is the contents of the callhome
    "callHomeGenerationTime": "2023-03-30T07:00:50.189Z"

TABLE 3-continued

Example of a HOLA report

```
    "subSystem": "SDNAS" //this is the sybsystem associated with the callhome
    "objectID": "642533a2-8a08-2c8b-628e-026048200205"
    "deviceID": "00108"
    "operationsPerformedOnFilesystem": "modify, snapSchedule, clone"
    "backendError": "283C01 x0001 APR/12/23 Task 1 time out on read command. Request to bring a track
into cache timed out" //this is an error found in the logs associated with the callhome
    "errorNoticed": "283C01" //this is an error generated by an inline utility
    "teamToTriage": "osha.triage@emc.com" //this is an identifier of a support team to which the HOLA
report and callhome event are routed
  }
  "systemConfiguration":
  {
    "numberOfNodes": 2
    "numberofNasServer": 30
    "numberofFilesystem": 75
    "numberofFileInterface": 30
    "numberofSnapSchedules": 50
    "ethDevicesConnected": 2
    "isReplicationEnabled": true
    "overProvisioningRatio": "2%"
    "effectiveCapacity": 100.94
    "effectiveUsed": 0.36
    "idleTime": "73.2 id"
  },
  "logsCollected":
  {
    "Assess report": yes
    "Complete File CSM": yes
  }
}
```

Consider an instance in which a call home is generated in response to a filesystem corruption or a filesystem going offline being detected. In such instance, HOLA 406 and/or log collector 404 may perform the following actions: (1) Based on the object being referenced in the callhome event, determine that the subsystem associated with the callhome is SDNAS; (2) Identify the subsystem and object type that are associated with the event by using database 412; (3) Detect, based on database 412, that the logs that need to be scanned in response to the callhome event are SDNAS logs and uCode; (4) Get the ObjectID from the callhome description; (5) Using the ObjectID, get all the details of the filesystem (storage Word Wide Node (WWN), size, type of the file system (FS) etc.); (6) From the storage WWN, get the device ID of the filesystem (i.e. the backend Logical Unit Number (LUN) ID) (7) Execute the inlines based on the deviceID for any backend errors that are detected. As used herein, the term "inline" refers to a utility to collect debug information from the memory of a storage processor. (8) If, in the inline outputs, one or more of the codes of "xx3c", "xx2c" and/or "xx10" are present, then determine that the filesystem corruption is due to backend issue, which requires the callhome to be forwarded to a uCode team for triage. (9) If there are no backend errors in the output of the inlines, get the time when the callhome was generated; (10) Scan restcmd.log to get the operations performed on that files system that has failed and also other operations performed during the same time; (11) Get the sequence of operations performed on that filesystem and errors noticed from the relevant SDNAS logs; (12) If the logs contain any occurrences of "Invalid device, invalid offset or buffer cache corruption", determine that the callhome needs to be reviewed by an SDNAS team; (13) If the predicates of steps 8 and 12 are not satisfied, collect the dmesg output from the setup and attach it to a "collect support material" (CSM) folder, and determine that the callhome needs to be forwarded to a PowerPath team. Dmesg, according to the present example, is a diagnostic message utility that prints the message buffer of the kernel in an operating system. The CSM folder, according to the present example, is a folder where information is being collected before being processed further or forwarded to a support team. (14) Include in the HOLA report for the callhome at least some or all of the information that is collected during the preceding steps; (14) Forward the callhome along with the HOLA report to the support team that is selected at one of steps '8', '12', and '13'.

Consider an instance in which a callhome is generated in response to one of a node's automatic recovery having failed, the node going offline, or fault tolerance of the node becoming degraded. As used in the present example, the term "node" refers to an entity that hosts a guest OS, such as a host OS for instance. In such instance, HOLA 406 and/or log collector 404 may perform the following actions: (1) Get the time when the callhome was generated; (2) Scan the SDNAS logs for 1 hr prior to the callhome generation, (3) add the logs to the HOLA report for the callhome; (4) If the logs contain the error of "Unable to connect to port 22" or the error of "BMC IP not reachable", determine that the callhome needs to be forwarded to a platform integration team; (5) otherwise if the errors discussed with respect to step '4' are not found in the logs, determine that the callhome needs to be forwarded to the SDNAS team; and (6) forward the callhome along with the HOLA report to the support team that is selected at one of steps '5' and '6'.

Consider an instance in which a callhome is generated when a High Availability (HA) resource is stopped or fenced. As used herein, the phrase "fencing an HA resource" includes forcing a reboot of the HA resource, or an entity hosting it such as a guest OS, to avoid certain failures. In such instance, HOLA 406 and/or log collector 404 may perform the following actions: (1) Get the time when the callhome was generated; (2) Retrieve the/var/log/messages and pacemaker logs for 1 hr prior to the callhome and add it to the HOLA report; and (3) forward the callhome and the HOLA report for the callhome to the platform integration team.

In instances in which a callhome is generated in response to another type of error, HOLA 406 and/or log collector 404 may perform the following actions: (1) Get the time when the callhome was generated; (2) Scan the restcmd.log to get the operations performed during the same time; (3) Scan the SDNAS logs, /var/log/messages, baseos.log and pacemaker logs for 1 hr prior to the callhome generation and add it to the HOLA report; (4) forward the callhome and the HOLA report for the callhome to the platform integration team.

In one implementation, report generator 410 may be arranged to upload logs (and/or other support materials, such as core dumps and HOLA report) that are collected for a callhome to a Callhome utility in Control Station (CS). Report generator 410 may also copy a summary report that is produced by classifier module 402 to the CS. All of these items may be associated with the ID of the callhome. In some implementations, CS may be management software that is used by customer support to re-configure and service storage system 110. CS may be similar to a mini desktop having many scripts and services required to perform manageability & serviceability activities with respect to storage system 110. The callhome utility may run in CS and it may implement a database where various callhomes and/or the coallhome support materials (such as HOLA reports and logs) can be reviewed by the support team assigned to handle the callhome.

FIGS. 5A-D show a flowchart of a process 500, according to aspects of the disclosure. According to the present example, the process 500 is performed by HOLA 406. However, the present disclosure is not limited to any specific entity performing the process 500.

At step 502, engine 306 detects an event. According to the present example, the event is a callhome event.

At step 504, engine 306 classifies the event as being associated with an environmental issue or a product issue. In some implementations, the classification may be performed by using a list that identifies different types of events as being directed to one of an environmental issue or a product issue. If the event is classified as being associated with an environmental issue, process 500 proceeds to step 506. If the event is classified as being associated with a product, process 500 proceeds to step 508.

At step 506, engine 306 routes the event to field support. Routing the event to field support may include one or more of: (i) transmitting the event to a computing system or device that is associated with field support, (ii) storing the event in a database along with an indication that the event needs to be handled by field support, and (iii) storing the event in a database or database portion that is associated with field support. Once the event is routed to field support, an appointment may be made for a field technician to visit the site of the failed system. In some implementations, the event may be routed to field support by report generator 410, which may generate a notification associated with the event and submit the notification to field support (e.g., by transmitting the notification to a predetermined address or storing the notification in a predetermined database or database portion).

At step 508, engine 306 collects logs and other support materials that are associated with the event. In some implementations, engine 306 may first use database 411 to identify the subsystem and the type of the object that is associated with the event, after which engine 306 may use database 411 to identify the logs and other materials that are associated with the event and need to be retrieved.

At step 510, engine 306 obtains the type of an object that is associated with the event. The type of the object may be retrieved from the contents of the event or from database 412.

At step 512, engine 306 detects whether the object type matches SDNAS. According to the present example, an object type matches SDNAS only if database 411 contains an entry that includes an identifier of the object type and an identifier of the SDNAS subsystem. If the object type matches SDNAS, process 500 proceeds to step 514. Otherwise, process 500 proceeds to step 516.

At step 514, engine 306 determines that the event is associated with the SDNAS subsystem.

At step 516, engine 306 determines that the event is associated with the Platform Integration subsystem.

At step 518, engine 306 determines whether a first precondition is true. According to the present example, the first precondition is true only when: (i) the event is associated with the SDNAS subsystem and a FILE_SYSTEM_OFFLINE object or (ii) the event is associated with the SDNAS subsystem and a FILE_SYSTEM_CORRUPTION object. If the second precondition is satisfied, process 500 proceeds to step 522. Otherwise, process 500 proceeds to step 520.

At step 520, engine 306 determines whether a second precondition is true. According to the present example, the second precondition is true only when: (i) the event is associated with the SDNAS subsystem and an AUTOMATIC_RECOVERY_FAILED object or (ii) the event is associated with the SDNAS subsystem and a NODE_OFFLINE object or (iii) the event is associated with the SDNAS subsystem and a FAULT_TOLERANCE_DEGRADED object. If the second precondition is satisfied, process 500 proceeds to step 536. Otherwise, process 500 proceeds to step 544.

At step 522, engine 306 retrieves: (i) an ID of the event, (ii) a sequence of operations that were performed by the guest OS where engine 306 is executed and/or by software executed by the guest OS and/or the storage processor executing the engine 306. In addition, engine 306 retrieves the configuration information of the guest OS or storage processor where engine 306 is executed, as well as inline reports for the events. Afterwards, the engine 306 instantiates a HOLA report and inserts the event ID, sequence of operations, and configuration information into the HOLA report.

At step 524, engine 306 determines if the inline reports contain one or more predetermined errors. If the inline report includes any of the one or more predetermined errors, process 500 proceeds to step 526. Otherwise, process 500 proceeds to step 528.

At step 526, engine 306 adds the inline report to the HOLA report and routes the HOLA report and event to a UCODE team.

At step 528, engine 306 retrieves SDNAS logs and adds the SDNAS logs to the HOLA report.

At step 530, engine 306 detects whether the SDNAS logs indicate invalid device, invalid offset, or buffer cache corruption errors. If the SDNAS logs indicate any of these errors, process 500 proceeds to step 532. Otherwise, process 500 proceeds to step 534.

At step 532, engine 306 routes the HOLA report and event to the SDNAS team.

At step 534, engine 306 of collects the output of DMESG, includes the output in the HOLA report, and routes the HOLA report to a Power Path team.

At step 536, engine 306 retrieves the configuration information and SDNAS logs of the guest OS or storage processor where engine 306 is executed. Afterwards, engine 306 instantiates a HOLA report for the event and inserts in the HOLA report the retrieved SDNAS logs and configuration information.

At step 538, engine 306 detects whether the SDNAS logs include an "unable to connect to port 22" error or an "IP not reachable" error. If the logs contain at least one of the two errors, process 500 proceeds to step 540. Otherwise, process 500 proceeds to step 542.

At step 540, engine 306 routes the event and HOLA report to the platform integration team.

At step 542, engine 306 routes the HOLA report and event to the SDNAS team.

At 544, engine 306 detects whether a third condition is true. According to the present example, the third precondition is true only when: (i) the event is associated with the PLATFORM INTEGRATION subsystem and a HA_RESOURCE_STOPPED object object or (ii) the PLATFORM INTEGRATION subsystem and a HA_RESOURCE fenced object. If the third precondition is satisfied, process 500 proceeds to step 546. Otherwise, process 500 proceeds to step 548.

At step 546, engine 306 instantiates a HOLA report. Next, engine 306 obtains the configuration information of the guest OS or storage processor where engine 306 is executed. Next, engine 306 obtains messages that are generated (or received) by event processing services 304. As noted above, in some implementations, event processing services 304 may include Corosync. Next, engine 306 adds all (or at least some) of the obtained information into the HOLA report and routes the HOLA report and event to the platform integration team.

At step 548, engine 306 instantiates a HOLA report. Next, engine 306 obtains the time when the event was generated. Next, engine 306 retrieves a sequence of operations that are performed in a predetermined period prior to the generation of the event. The sequence of operations may be retrieved from a predetermined log, such as restcmd.log. Next, engine 306 retrieves a predetermined set of materials. According to the present example, the set of materials includes a SDNAS logs, base_OS logs (e.g., logs that belong to the guest OS where engine 306 is executed, and which also executes an SDNAS layer), messages generated (or received) by the event processing services 304, and/or logs of the event processing services, or pacemaker logs. Next, engine 306 adds all (or at least some) of the obtained information into the HOLA report and routes the HOLA report and event to the platform integration team.

Figure 5A:
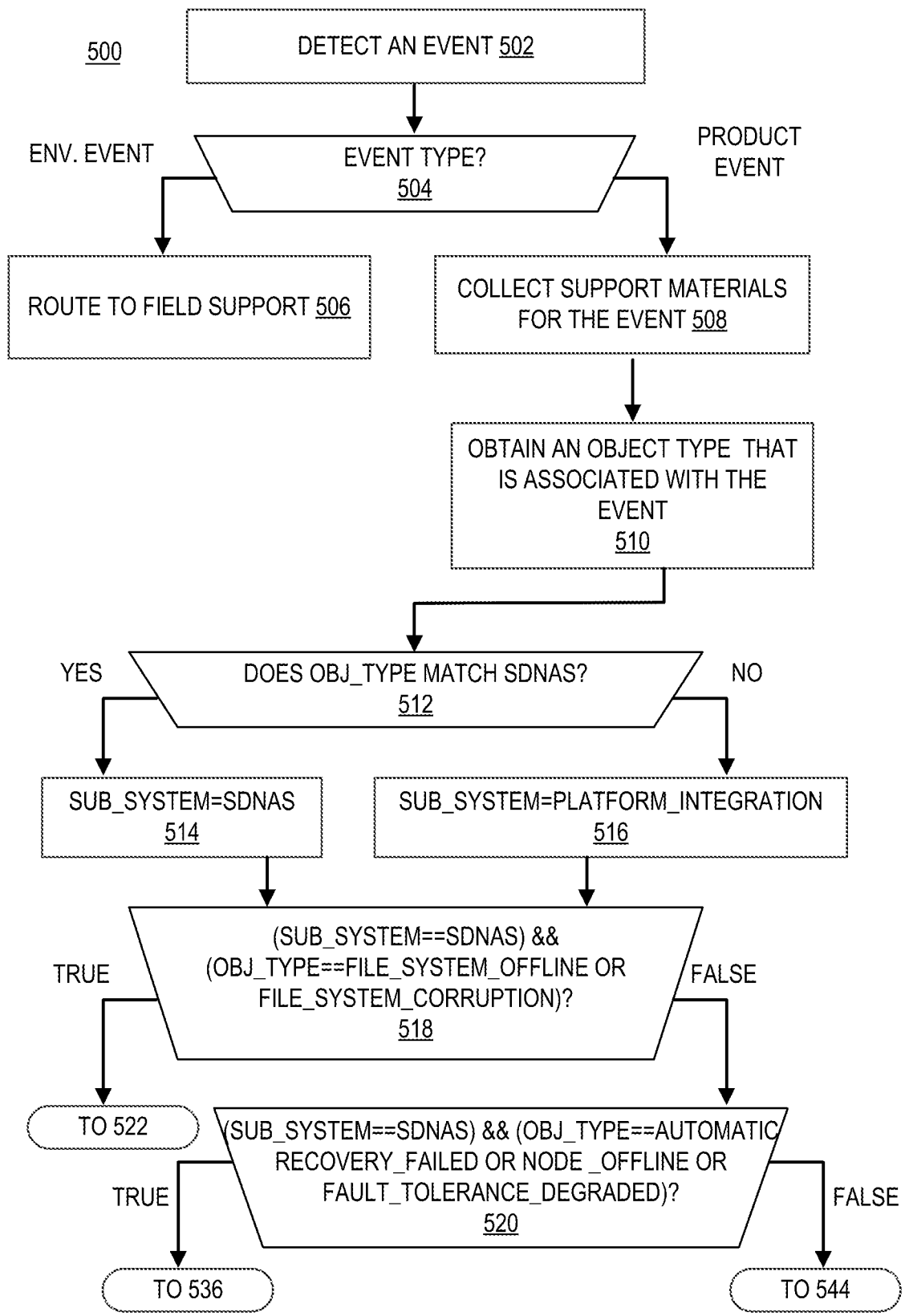
FIG. 5A is a flowchart of an example of a process, according to aspects of the disclosure.
Figure 5B:
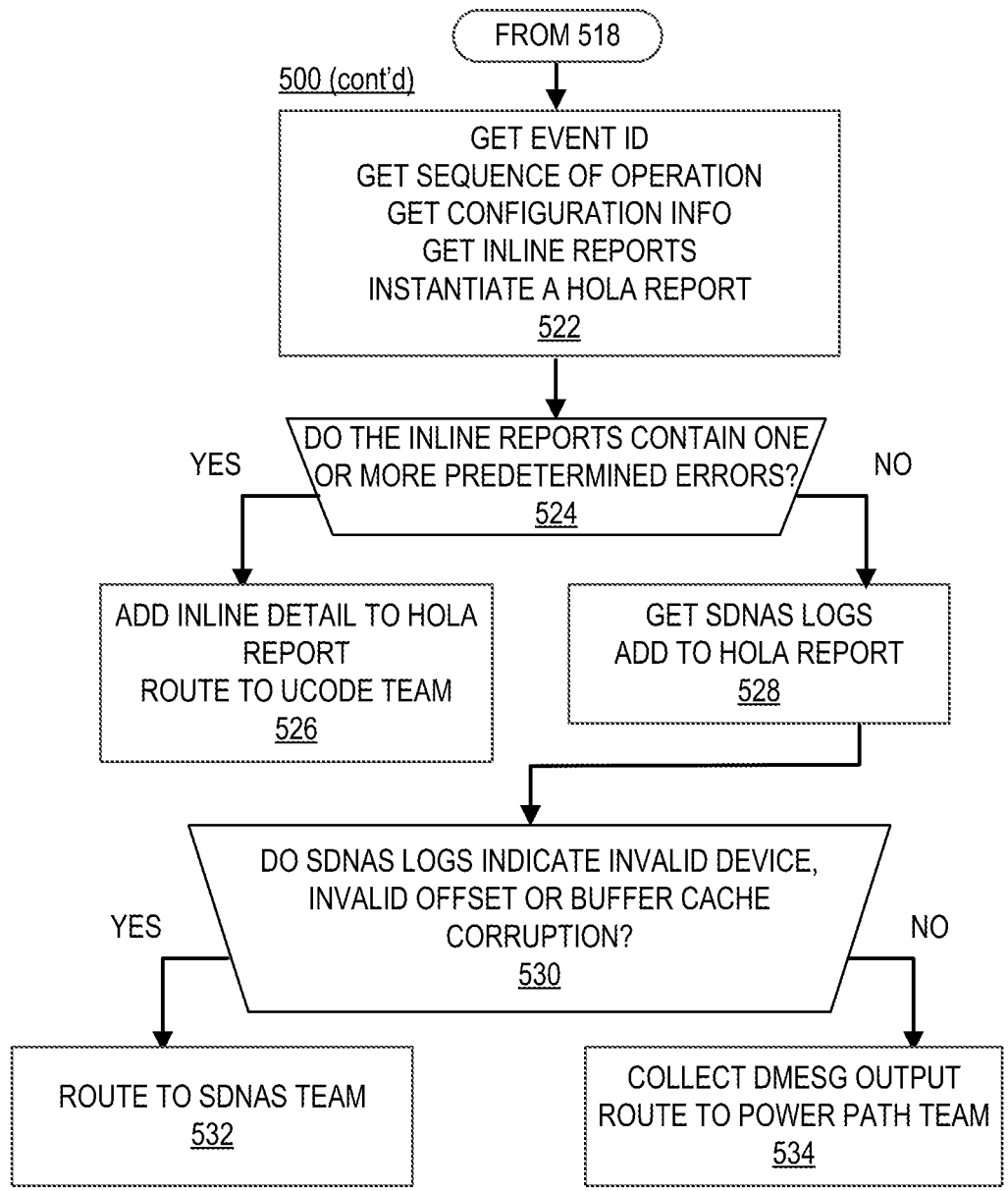
FIG. 5B is a flowchart of an example of a process, according to aspects of the disclosure.
Figure 5C:
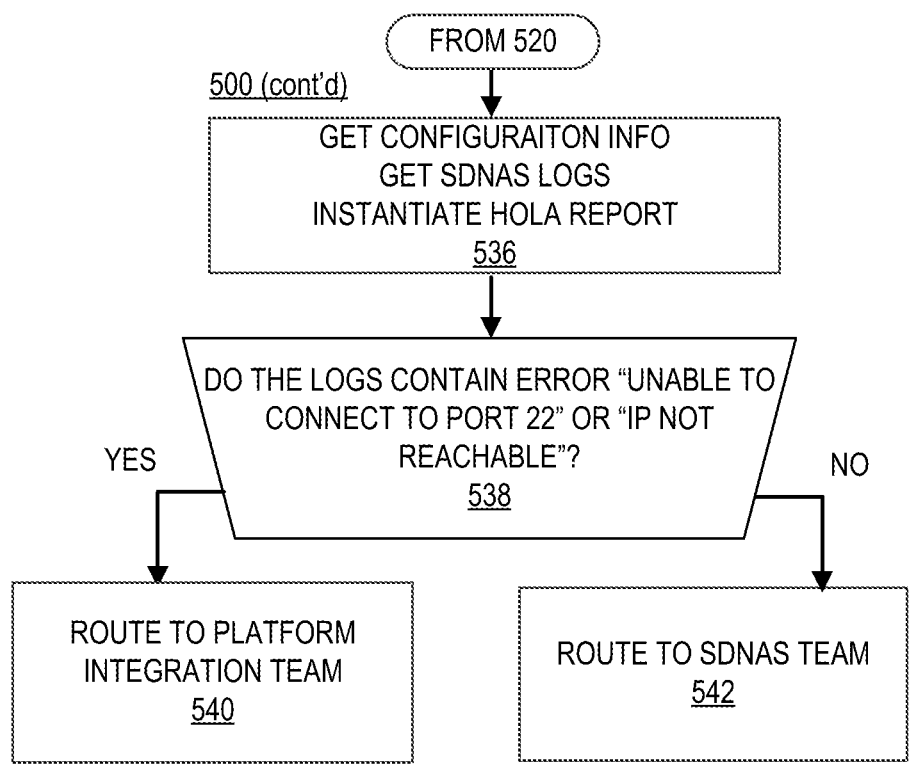
FIG. 5C is a flowchart of an example of a process, according to aspects of the disclosure.
Figure 5D:
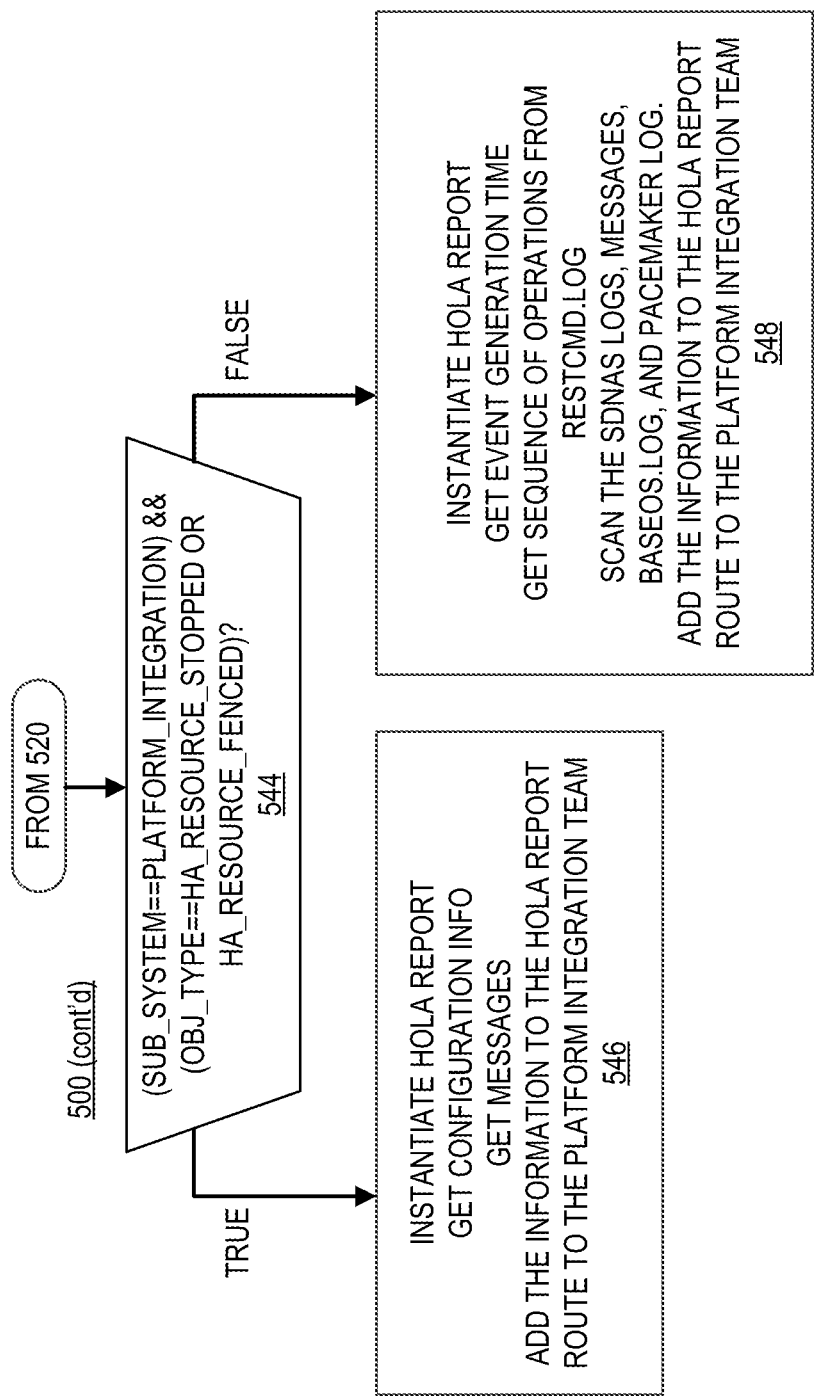
FIG. 5D is a flowchart of an example of a process, according to aspects of the disclosure.

In the example of FIGS. 4-5D, examples of different support teams are provided, such as the platform integration team, uCode team, and SDNAS teams. According to the present example, each of these teams specializes in troubleshooting or developing a different portion of the software that makes up the storage system 110. Beyond recognizing, that each of these teams specializes in managing a different portion of a larger system, the exact specialization of the teams may vary depending on the context in which the engine 306 is deployed. Although, in the present example, engine 306 is used to route error messages for a storage system, it will be understood that the present disclosure.

In the example of FIG. 5, an event is associated with either the SDNAS subsystem or the Platform Integration subsystem. Furthermore, in the present example, the Platform Integration subsystem is a placeholder for various portions of storage system 110 that are different from the SDNAS layer. However, it will be understood that the set of possible subsystems that may be associated with an event could vary depending on the context in which engine 306 is deployed.

In some implementations, engine 306 may be integrated into the cluster stack of storage system 110 by leveraging the existing capabilities of the cluster stack. In one example, Corosync may be extended to detect callhome events that are generated in the storage system 110 and provide the callhome events to the engine 306. Using Corosync to feed callhome events to engine 306 provides a high-availability solution for supporting the components running in the guest operating systems 216.

In another aspect, engine 306 may be integrated with CS by modifying a software layer used to feed callhomes to CS to receive both an event and HOLA report for the event as input, as well as all of the logs and core dumps that are included in (or referenced by) the HOLA report, and push this information in the regular support log location.

In the example of FIGS. 4-5D, logs and core dumps are described as being included in a HOLA report. However, alternative implementations are possible in which the logs and core dumps are referenced in the HOLA report. In such implementations, a routing of the HOLA report may trigger a routing (e.g., storage and/or transmission) of the referenced logs and core dumps to the same location where the HOLA report is routed.

Figure 6:
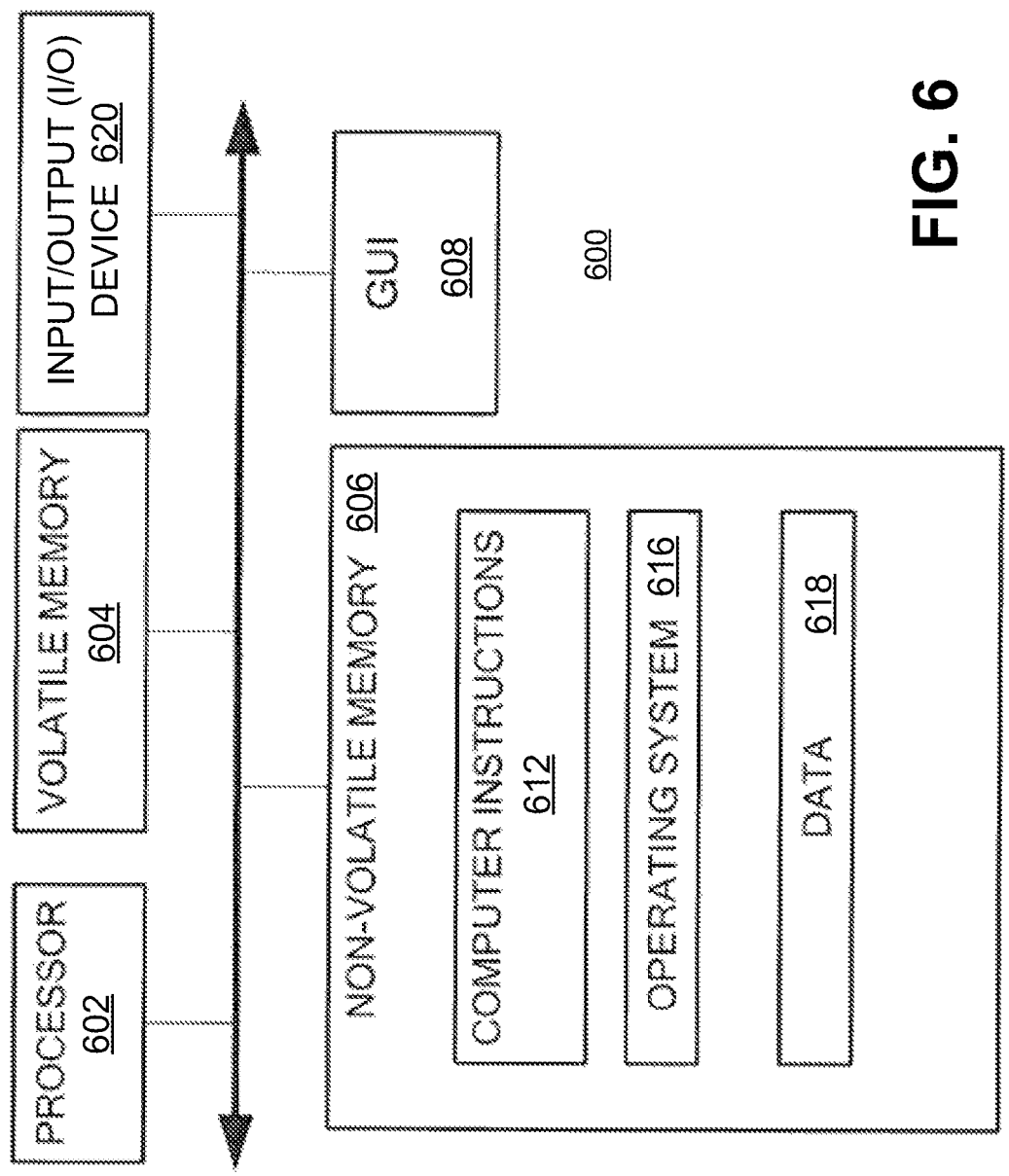
FIG. 6 is a diagram of an example of a computing device, according to aspects of the disclosure.

Referring to FIG. 6, in some embodiments, a computing device 600 may include processor 602, volatile memory 604 (e.g., RAM), non-volatile memory 606 (e.g., a hard disk drive, a solid-state drive such as a flash drive, a hybrid magnetic and solid-state drive, etc.), graphical user interface (GUI) 608 (e.g., a touchscreen, a display, and so forth) and input/output (I/O) device 620 (e.g., a mouse, a keyboard, etc.). Non-volatile memory 606 stores computer instructions 612, an operating system 616 and data 618 such that, for example, the computer instructions 612 are executed by the processor 602 out of volatile memory 604. Program code may be applied to data entered using an input device of GUI 608 or received from I/O device 620.

FIGS. 1-6 are provided as an example only. At least some of the steps discussed with respect to FIGS. 1-6 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. The phrase "memory space of a guest operating system" may refer to volatile or non-volatile memory which the guest operating system (or applications running within the guest operating system) is allowed to access.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard. (1/23)

It will be further understood that various changes in the details, materials, and arrangements of the parts which have been described and illustrated in order to explain the nature of the claimed invention might be made by those skilled in the art without departing from the scope of the following claims.

The invention claimed is:

1. A method, comprising:
   detecting an event that is indicative of an error that has occurred in a first computing system;
   identifying a subsystem and an object that are associated with the event;
   identifying one or more log files that are associated with the subsystem and object;
   generating a first event report that is associated with the event, the first event report including the one or more log files, the first event report identifying the subsystem and the object that are associated with the event;
   identifying a support team that is associated with the event based on the object and subsystem; and
   routing the first event report to the support team,
   wherein identifying the subsystem includes performing a search of a first database based on contents pf the event, and retrieving an identifier of subsystem, and
   wherein the database includes a plurality of entries, each of the entries including a respective event signature and a respective subsystem identifier that corresponds to the respective event signature.

2. The method of claim 1, wherein the event includes a callhome event and the first event report includes a Holistic Log Analyzer module (HOLA) report.

3. The method of claim 1, wherein routing the first event report to the support team includes storing, in a second database, an indication that the event is required to be handled by the support team.

4. The method of claim 1, wherein routing the first event report to the support team includes transmitting the first event report to a second computing system that is associated with the support team.

5. The method of claim 1, further comprising classifying the event as being associated with either a configuration problem or a software bug, wherein the first event report is generated and routed to the support team only when the event is classified as being associated with a software bug.

6. The method of claim 1, wherein:
the first computing system includes a clustered computing system having a plurality of guest operating systems that are executed in a virtualized environment of the first computing system;
and the generating and routing steps are performed by an event processing engine that is executed in one of the plurality of guest operating systems.

7. A system, comprising:
a memory; and
one or more processors that are coupled to the memory, the one or more processors being configured to perform the operations of:
detecting an event that is indicative of an error that has occurred in a first computing system;
identifying a subsystem and an object that are associated with the event;
identifying one or more log files that are associated with the subsystem and object;
generating a first event report that is associated with the event, the first event report including the one or more log files, the first event report identifying the subsystem and the object that are associated with the event;
identifying a support team that is associated with the event based on the object and subsystem; and
routing the first event report to the support team,
wherein identifying the subsystem includes performing a search of a first database based on contents of the event, and retrieving an identifier of the subsystem, and
wherein the first database includes a plurality of entries, each of the entries including a respective event signature and a respective subsystem identifier that corresponds to the respective event signature.

8. The system of claim 7, wherein the event includes a callhome event and the first event report includes a Holistic Log Analyzer module (HOLA) report.

9. The system of claim 7, wherein routing the first event report to the support team includes storing, in a second database, an indication that the event is required to be handled by the support team.

10. The system of claim 7, wherein routing the first event report to the support team includes transmitting the first event report to a second computing system that is associated with the support team.

11. The system of claim 7, wherein the at least one processor is further configured to perform the operation of classifying the event as being associated with either a configuration problem or a software bug, and wherein the first event report is generated and routed to the support team only when the event is classified as being associated with a software bug.

12. The system of claim 7, wherein:
the first computing system includes a clustered computing system having a plurality of guest operating systems that are executed in a virtualized environment of the first computing system;
and the generating and routing steps are performed by an event processing engine that is executed in one of the plurality of guest operating systems.

13. A non-transitory computer-readable medium storing one or more processor-executable instructions, which, when executed by at least one processor, cause the at least one processor to perform the operations of:
detecting an event that is indicative of an error that has occurred in a first computing system;
classifying the event as being associated with either a configuration problem or a software bug;
identifying a subsystem and an object that are associated with the event;
identifying one or more log files that are associated with the subsystem and object;
generating a first event report that is associated with the event, the first event report including the one or more log files, the first event report identifying the subsystem and the object that are associated with the event;
identifying a support team that is associated with the event based on the object and subsystem; and
routing the first event report to the support team, wherein the first event report is generated and routed to the support team only when the event is classified as being associated a software bug.

14. The non-transitory computer-readable medium of claim 13, wherein the event includes a callhome event and the first event report includes a Holistic Log Analyzer module (HOLA) report.

15. The non-transitory computer-readable medium of claim 13, wherein routing the first event report to the support team includes storing, in a database, an indication that the event is required to be handled by the support team.

16. The non-transitory computer-readable medium of claim 13, wherein routing the first event report to the support team includes transmitting the first event report to a second computing system that is associated with the support team.

17. The non-transitory computer-readable medium of claim 13, wherein:
identifying the subsystem includes performing a search of a database based on contents of the event, and retrieving an identifier of the subsystem; and
the database includes a plurality of entries, each of the entries including a respective event signature and a respective subsystem identifier that corresponds to the respective event signature.

* * * * *